(12) United States Patent
Ombäck et al.

(10) Patent No.: US 12,311,433 B2
(45) Date of Patent: May 27, 2025

(54) METHOD OF MANUFACTURING A TUBE SNAP FASTENING ARRANGEMENT

(71) Applicant: ROL AB, Jönköping (SE)

(72) Inventors: Stellan Ombäck, Jönköping (SE); Fredrik Dahlberg, Jönköping (SE)

(73) Assignee: ROL AB, Jönköping (SE)

( * ) Notice: Subject to any disclaimer, the term of this patent is extended or adjusted under 35 U.S.C. 154(b) by 21 days.

(21) Appl. No.: 17/407,977

(22) Filed: Aug. 20, 2021

(65) Prior Publication Data

US 2022/0062970 A1 Mar. 3, 2022

(30) Foreign Application Priority Data

Aug. 28, 2020 (EP) ..................................... 20193250

(51) Int. Cl.
*B21J 5/06* (2006.01)
*B23P 11/00* (2006.01)
(Continued)

(52) U.S. Cl.
CPC ............... *B21J 5/068* (2020.08); *B23P 11/00* (2013.01); *B23P 11/02* (2013.01); *B29C 65/567* (2013.01);
(Continued)

(58) Field of Classification Search
CPC . B21J 5/068; B23P 11/00; B23P 11/02; B29C 65/567; B29C 65/58; B29C 65/64;
(Continued)

(56) References Cited

U.S. PATENT DOCUMENTS 3,494,684 A * 2/1970 Benson .................. F16C 33/516
72/476
3,685,114 A * 8/1972 Vannest .............. F16C 33/4623
29/898.067
(Continued)

FOREIGN PATENT DOCUMENTS

DE 8501839 U1 4/1985
FR 2691098 A1 11/1993
(Continued)

OTHER PUBLICATIONS

Extended European Search Report for co-pending EP20193250.6; 28 pages, Feb. 24, 2021.

*Primary Examiner* — Sarang Afzali
*Assistant Examiner* — Darrell C Ford
(74) *Attorney, Agent, or Firm* — Kagan Binder, PLLC

(57) ABSTRACT

The invention relates to a method (100) for manufacturing a fastening arrangement for fastening a collar to a tube. The method comprises the steps of providing a hollow tube (10), arranging said tube for receiving at least one forming punch (30) in the axial direction of the tube, punching the tube with a forming punch at an inner radial part of an edge portion (16) of the tube in the axial direction of the tube, locally reducing the tube thickness, so that the material being punched is plastically relocated in the axial direction, locally forming a snap portion (11) in the form of a flange (12) in the radial direction towards the hollow inside of the tube, (Continued)

providing a collar (20) configured to be arranged on the tube, wherein the collar comprises at least one receiving portion (21) arranged to receive said snap portion, and arranging the collar to the tube such that the snap portion engages with said receiving portion.

12 Claims, 5 Drawing Sheets

(51) Int. Cl.
*B23P 11/02* (2006.01)
*B29C 65/00* (2006.01)
*B29C 65/56* (2006.01)
*B29C 65/58* (2006.01)
*B29C 65/64* (2006.01)
*B29L 31/44* (2006.01)
*F16B 12/10* (2006.01)

(52) U.S. Cl.
CPC .............. *B29C 65/58* (2013.01); *B29C 65/64* (2013.01); *B29C 66/53245* (2013.01); *F16B 12/10* (2013.01); *B29L 2031/44* (2013.01); *Y10T 29/49876* (2015.01)

(58) Field of Classification Search
CPC .............. B29C 66/53245; B29C 66/21; B29C 66/24244; B29C 66/5344; B29C 66/81433; B29C 66/8322; B29C 57/00; B29C 66/612; B29C 66/742; B29C 66/81415; F16B 12/10; F16B 7/10; F16B 7/105; B29L 2031/44; Y10T 29/49876; F16L 9/003; F16L 27/12; B21C 37/28; B21K 23/00; B21D 28/10

USPC ................ 72/370.1, 370.14, 370.15; 29/453
See application file for complete search history.

(56) References Cited

U.S. PATENT DOCUMENTS

| | | | | |
|---|---|---|---|---|
| 5,421,556 | A * | 6/1995 | Dodge | E04H 17/006 403/375 |
| 5,881,595 | A * | 3/1999 | Sørensen | F28F 9/02 72/391.2 |
| 6,189,361 | B1 * | 2/2001 | Seki | B21C 51/005 72/395 |
| 6,450,553 | B1 * | 9/2002 | Suresh | B21D 39/04 29/520 |
| 8,011,220 | B2 * | 9/2011 | Brochheuser | B21J 5/12 72/370.14 |
| 9,266,200 | B2 * | 2/2016 | Caspall | B23P 15/003 |
| 2005/0155209 | A1 * | 7/2005 | Isendam | F16L 37/025 29/446 |
| 2010/0129148 | A1 * | 5/2010 | Giannasca | F16B 5/0628 403/376 |
| 2011/0027605 | A1 * | 2/2011 | Horng | B32B 3/30 428/575 |
| 2013/0192329 | A1 * | 8/2013 | Otsubo | F28F 1/04 72/325 |
| 2014/0284036 | A1 * | 9/2014 | Gotterbarm | F28F 1/12 165/181 |
| 2018/0202476 | A1 * | 7/2018 | Wu | A47B 9/20 |

FOREIGN PATENT DOCUMENTS

| | | |
|---|---|---|
| JP | 2001332666 A | 11/2001 |
| PL | 70548 Y1 | 1/2019 |
| WO | 2019210917 A1 | 7/2019 |

* cited by examiner

METHOD OF MANUFACTURING A TUBE SNAP FASTENING ARRANGEMENT

CROSS-REFERENCE TO RELATED APPLICATIONS

This application claims priority to European Application No. 20193250.6, filed Aug. 28, 2020 and titled "METHOD OF MANUFACTURING A TUBE SNAP FASTENING ARRANGEMENT," which is incorporated herein by reference in its entirety.

TECHNICAL FIELD

The present disclosure relates to a method of manufacturing a fastening arrangement, and especially of a tube fastening arrangement.

BACKGROUND

In many applications there is a need to attach slim parts that require smooth surfaces, such as in telescopic tube arrangements. Often in telescopic arrangements, there are two tubes, a first with a smaller outer diameter arranged within a second tube with a larger inner diameter than the outer diameter of the first tube. Often, in order to assure a smooth arrangement, the joint between the two tubes may be provided with a collar which adjusts the fit and smoothen any telescopic movement. In the field there are a large number of fastening techniques to fasten the collar to the first outer tube. It can be done by penetrating fastening elements such as screws, nails and rivets. However, these methods leave marks in the surfaces of both parts. In this field of use it would be very undesirable to locally add to the final thickness of the tube, since many applications require a smooth surface without obstructions.

A way to solve this may be by arranging the collar by a press fit. However, the inner tube of telescopic arrangement may rub against the collar and eventually the collar loosens and wears off. A way to solve this may be providing a snap arrangement in which a hook or clip piece may be glued, soldered or welded on to the outer tube, and a corresponding receiving portion on the collar to engage with the snap portion.

However, this procedure adds to the manufacturing process. Also, the joining process through gluing, welding or soldering may affect the strength of the final product and leave undesired marks on the outside of the product.

Hence, there is a need for an improved solution which improves the quality and cost-efficiency of the final product.

SUMMARY

It is an object of the present invention to provide an improved solution that alleviates the mentioned drawbacks with present devices. Furthermore, it is an object to provide a method of manufacturing a fastening arrangement that is invisible from an outer surface which is in view from the outside. It is a further object to provide a fastening arrangement provided with such method. It is a further object to provide a tube arrangement having a fastening arrangement according to the invention.

An aspect of the present invention is thus to provide a method for manufacturing a fastening arrangement for fastening a collar to a tube. The tube has a material thickness surrounding the circumference of the tube forming an inner surface towards the hollow of the tube and an outer surface facing radially outwards. The method comprises the steps of providing a hollow tube, arranging said tube for receiving at least one forming punch in the axial direction of the tube, punching the tube with a forming punch at an inner radial part of an edge portion of the tube in the axial direction of the tube, locally reducing the tube thickness, so that the material being punched is plastically relocated in the axial direction, locally forming a snap portion in the form of a flange in the radial direction towards the hollow inside of the tube, providing a collar configured to be arranged on the tube, wherein the collar comprises at least one receiving portion arranged to receive said snap portion, and arranging the collar to the tube such that the snap portion engages with said receiving portion.

With such a method, the appearance of the final product may obtain a smooth outer surface, as well as the manufacturing becomes more effective. The punching is thus performed at a part of the tube material thickness so that the outer surface is left unchanged and undamaged. In that way, the original material of the tube is used for forming the flange. In other words, no material is added to the tube for manufacturing the fastening arrangement. The material of the tube is neither removed from the tube. The material is merely relocated by plastically moving or pushing it to a different location than the original. It is emphasized that the wording "outer" and "inner" is meant for relative purposes and the flange may of course be arranged at any surface where needed. The relation may be opposite, and the punching may be done so that a flange is formed at an outer surface, in the case an inner surface should be smooth.

The tube may be provided by a plurality of flanges by means of a plurality of punches. Alternatively through one punch by means of a forming punch punching at a plurality of locations simultaneously. The collar may be provided with a corresponding number of receiving portions. In embodiments the tube may be provided with two, four, eight flanges, or more.

According to one embodiment, the collar may comprise a top portion having a thickness and a width and a side portion having a length and a thickness, the top portion and the side portion being arranged perpendicular to each other in an L-shape, and the step of arranging the collar may comprise inserting the side portion of the collar into the tube so that an underneath surface of the top portion may be arranged against the edge portion of the tube and the snap portion engages with the receiving portion.

According to one embodiment, the flange may assume a shape substantially corresponding to the shape of the forming punch.

The forming punch may have a shape that suits the product and the collar to be fastened. For instance, in some cases, the collar may in use be subjected to an outer force and therefore the fastening arrangement may need to be strong. In such case, the forming punch may be of a size so that the resulting flange can effectively hold the collar. The forming punch may be square or rectangular, and thus the flange may result in a square or rectangular shape, as seen in the punching direction. The forming punch may be triangular, and thus resulting in a triangular flange, as seen in the punching direction.

According to one embodiment, the flange thickness may relate to the amount of material being relocated. That is, if the punch distance is longer, the amount of material moved will be more than if the punch is shorter. In that way, it is possible to adjust the amount of material to be relocated and to form the flange according to the required strength. The flange thickness may also be depending on the depth of the punch, that is seen in the punching direction. In other words, the punch may be adjusted depending on how much of the thickness of the tube is being punched. This may be an advantage since in some cases the flange may need to be stronger and thicker, and thus consist of more material than in other the event a less strong fastening arrangement is required. This type of fastening arrangement thus provides a flexible solution wherein the shape and size may easily be adjusted due to the length of the punch and the size of the forming punch.

According to one embodiment the forming punch may comprise a hook forming portion, so that upon punching, the flange assumes a hook shaped edge.

The punch may thus comprise a punch surface which is patterned. The patterned punch surface may thus be formed so that the flange may assume the shape of the forming punch surface. Therefore, the punch may include a shape that transfers onto the punched flange, such as an upward bend, a chamfer, a ridge, a groove, a cut or a hook. The collar may similarly be provided with a corresponding receiving portion to receive the flange with a bend, ridge or hook. The bend, ridge or hook, or the like may be arranged to securely engage with the corresponding receiving portion. The patterned surface may include rifling in order to transfer a rifled pattern onto the flange upper surface for additional securing of the receiving portion. The hook shaped edge may be sized and shaped to engage with the corresponding receiving element. The receiving element may be arranged on a part to be fastened with the product made from the tube.

According to one embodiment, the arranging step may comprise arranging the tube in a holder and arranging a punching die at the location of where the flange is to be located so that the punch may be pushed towards said punching die and the flange is pressed against said punching die. The punching die may be part of the holder. The punching die may be arranged at a predetermined distance from the edge of the tube so that the dimensions of a final product may be predictable.

Alternatively, the snap portion may be formed in the punching step without use of a punching die. In either case, the forming punch may punch on the edge portion of the tube in the axial direction with a speed and force adapted to form a desired shape of the snap portion based on the composition of the material of the tube. The speed and force may further be based on the size of the intended snap portion, and on the amount of material intended to be dislocated.

According to one embodiment, the punching die may have a surface onto which the flange is pushed so that the underside of the flange assumes the shape of the punching die. The surface of the punching die may have a shape and a pattern so that the flange may assume the shape and/or pattern of the punching die. In that way any bends, chamfers, rifling or the like may be pre-formed.

According to one embodiment, the method may further comprise a subsequent flange forming step. In this subsequent forming step, it may be possible to adjust the dimensions and/or shape which may not be possible during the first punching step. This may be any adjustment such as forming the flange underneath or adjusting dimensions so that the flange properly fits within the receiving element. It may also mean rounding the flange. The subsequent forming step may be done by removing material by for example cutting. It may alternatively be done by heating the material and thus melting the material into a shape. It may also be a mix of methods and thus including more than one forming sub steps.

According to one embodiment, the method may further comprise a trimming step for trimming the tube and the flange from sharp ends. This step may be for cleaning the tube so that trims and sharp edges are removed. It is possible that the trimming step may include rounding and chamfering of the edges. The trimming may be done by cutting, grinding, honing or the like.

According to one embodiment, the tube may be a metal tube. The thickness may vary depending on the type of tube. The metal tube may have a thickness of 1-15 mm. The tube may alternatively be of a plastic material which has a composition suitable for plastic deformation. The plastic material may have a thickness suitable for the product on which the tube is to be part of.

According to one embodiment, the punching step may be preceded by or including a warming step, which includes warming the forming punch and/or the tube in order to soften the tube material and facilitate the relocation of the material. This may be an advantage since the occurrence of cracks and splits may be prevented. By warming the material, the force of which the punch is performed may also be lower.

According to one embodiment, the collar may be made of a plastics material. The collar may be made from a material that does not scratch the metal surface of the tube. The collar may be made of a material flexible enough to be snapped onto the flange of the snap portion of the tube. The receiving portion may be provided by an opening or hole configured to receive the flange.

According to one embodiment, the receiving portion may be made by punching. The receiving portion may be made by removing material, such as by punching or cutting.

According to one embodiment, the collar may be made by casting, 3d-printing or the like.

According to a second aspect of the invention, there is provided a fastening arrangement for the fixing of a collar to a tube. The fastening arrangement comprises a snap portion being formed integrally with the tube by relocating material in an axial direction by punching of the tube from a first location to a second location forming a radial flange. The collar comprises a corresponding receiving portion for receiving said snap portion.

The tube may thus have a snap portion which may be formed in one single material with the tube. The snap portion may be manufactured by punching. Therefore, the material relocated from the first location to the second location may leave a groove from the forming punch where the relocated material used to be. This type of fastening arrangement provides a flexible solution wherein the shape and size may easily be adjusted due to the length of the punch and the size of the forming punch. The snap portion may be in the form of a flange which is constituted by the relocated material.

According to a third aspect of the invention there is provided a telescopic arrangement comprising a fastening arrangement according to the invention.

There are no limits to where this fastening arrangement may be used. It may be suitable in any application, and the punched snap portion may be scaled to any size.

In one embodiment, the product may be made from a sheet metal having a thickness of 1-15 mm. The fastening arrangement may be suitable in applications where there is little excess material to hide fastening elements, for instance in sheet metal applications.

In one embodiment, there is provided an inner tube, having outer dimensions smaller than the inner dimensions of the tube and arranged within the hollow of the tube. This may provide a telescopic arrangement, and the smooth fastening of the collar within the tube, the telescopic arrangement may run smooth.

In one embodiment, the tube may be rectangular in cross section and having an outer surface and an inner surface. The tube may of course be any shape. The tube may be round, for round telescopic tube arrangements, or any other suitable shape and size depending on the specific product.

BRIEF DESCRIPTION OF THE DRAWINGS

The invention will in the following be described in more detail with reference to the enclosed drawings, wherein.

DESCRIPTION OF EMBODIMENTS

The present invention will be described more fully hereinafter with reference to the accompanying drawings, in which preferred embodiments of the invention are shown.

Figure 1:
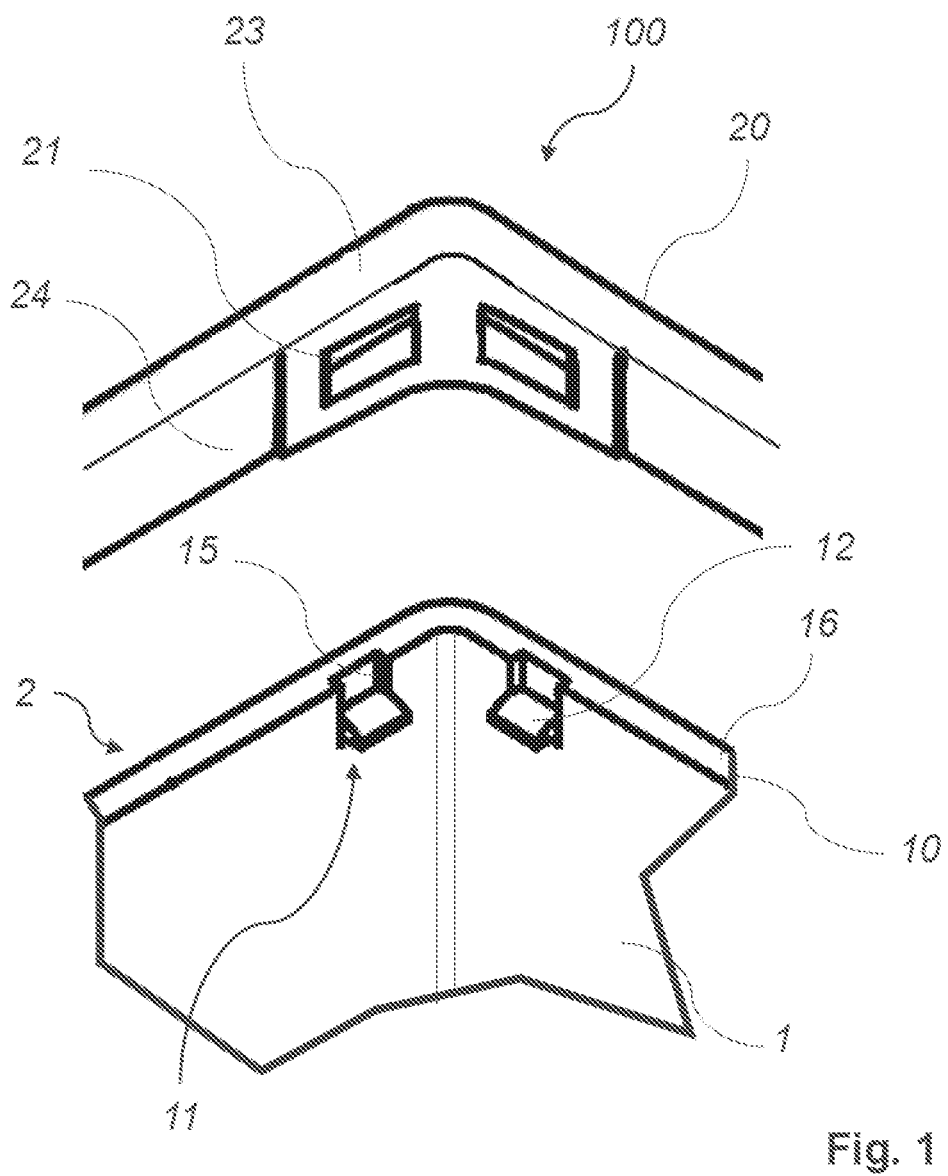
FIG. 1 is a perspective view of a fastening arrangement according to an embodiment of the invention.

Referring to FIG. 1, there is shown a fastening arrangement 100 according to the invention. The fastening arrangement is arranged to fix a tube 10 and a collar 20 to each other. The tube 10 comprises a flange 12 being arranged to be received in a receiving portion 21 in the collar 20. The tube 10 has an outer surface 2 and an inner surface 1. The inner surface 1 is provided with a flange 12 which is part of a snap portion 11 of the fastening arrangement 100. The snap portion 11 is configured to be arranged in a receiving portion 21 of the collar 20. It may be called snap portion 11 since the flange may be arranged such that it snaps in place in the receiving portion 21 and may thus be fixed. The collar 20 may thus be arranged on the tube 10 so that the snap portion 11 and the receiving portion 21 are engaged. As seen, the snap portion 11 is arranged on the inner surface 1 of the tube 10 at an edge portion 16 of the tube 10. The inner side 1 is the side facing the inner hollow of the tube 10. The outer surface 2 is the opposite side of the inner surface 1.

Figure 2:
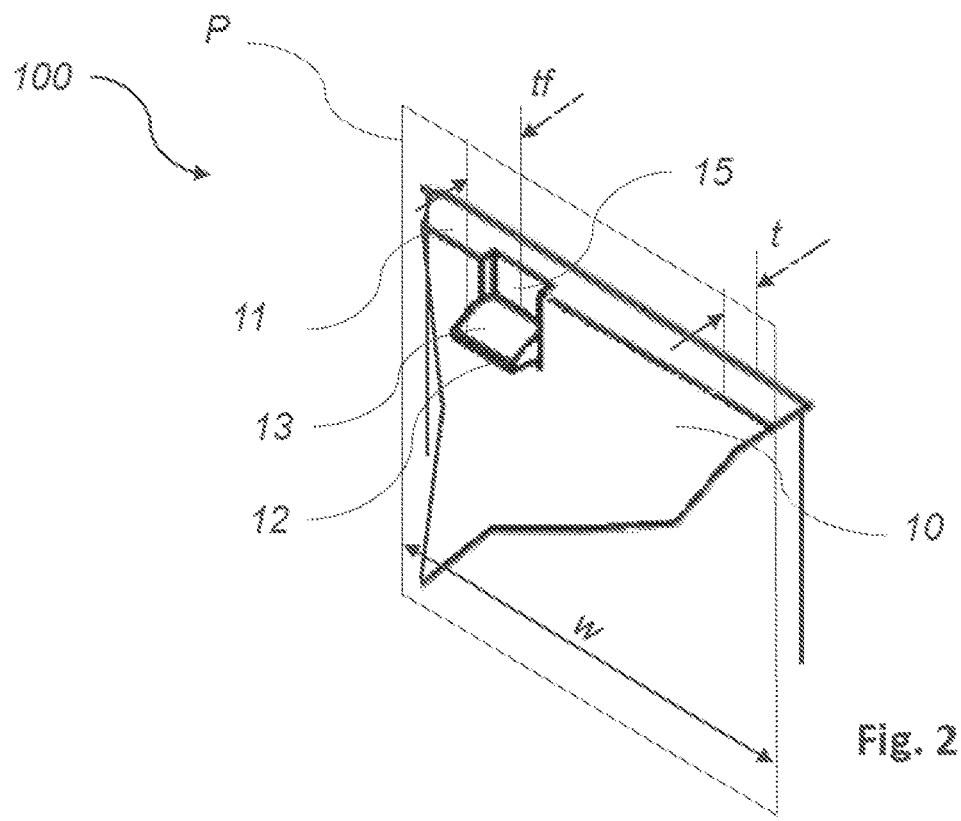
FIG. 2 is a perspective view of a fastening arrangement according to an embodiment of the invention.

Referring to FIG. 2, the tube 10 with a snap portion 11 is shown in more detail. The tube 10 in FIG. 1 has a thickness t and a width w. The snap portion 11 comprises a flange 12. The snap portion 11 according to an embodiment is manufactured by relocating material from one location of the tube 10 to form the flange 12. The relocation of the material is done by pushing the material along the inner surface 1. The material is not removed from the tube 10, to be reinstated therein. The material is relocated as part of the tube 10, and plastically moves along the tube 10 to its final location and forming the flange 12. Due to the relocation of material, and thus formation of the flange 12, a groove 15 is formed where the material originally was located.

Figures 3A, 3B:
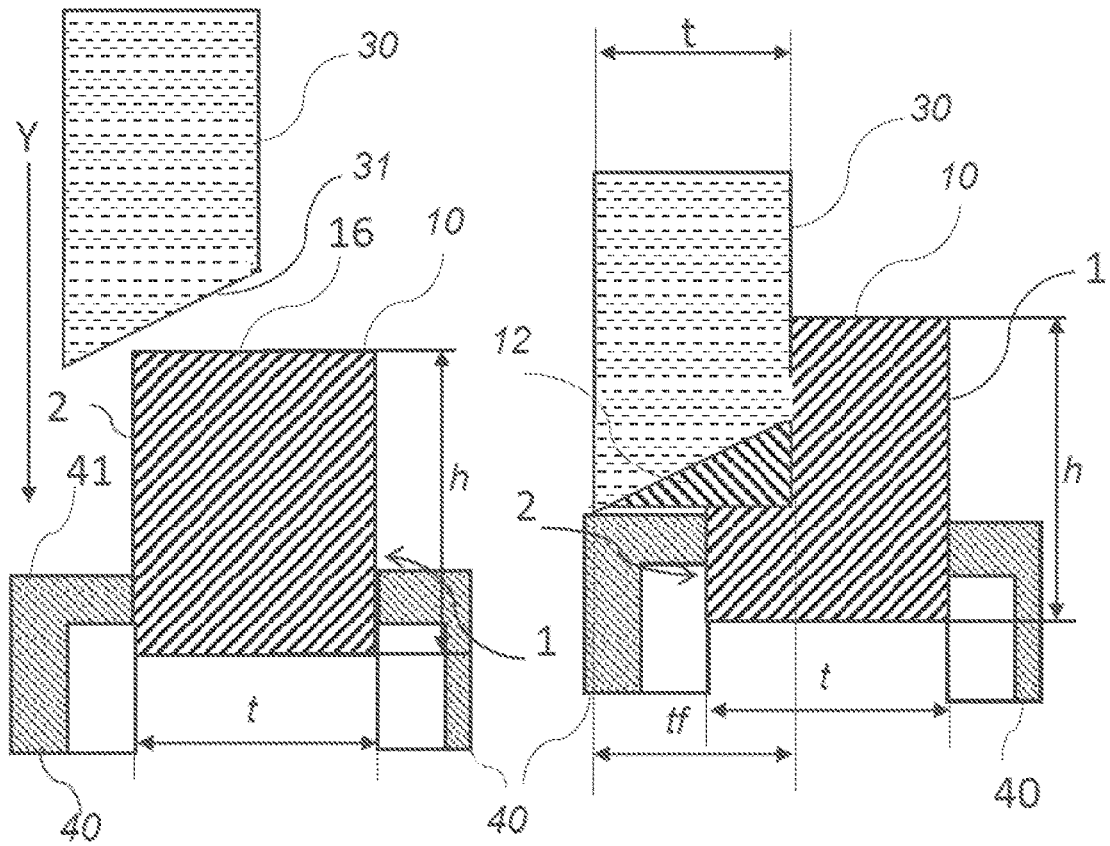
FIG. 3a is a side view of a schematic figure of the manufacturing method according to an embodiment of the invention.
FIG. 3b is a cross sectional side view of a schematic figure of the manufacturing method according to an embodiment of the invention.

In FIGS. 3a and 3b, it is schematically shown the method of forming the flange 12. The tube 10 is provided. The tube 10 has a thickness t and a width w, and an inner surface 1 and an outer surface 2. The tube 10 is prepared for receiving a punch from a forming punch 30. The forming punch 30 hits the tube at an edge portion 16 towards the inner surface 1. The forming punch 30 punches the tube 10 so that material from the tube 10 is pushed in the punching direction Y towards a second location forming a flange 12. The punching direction may be vertical, but the tube may also be arranged so that the punching is done in another direction. The flange may assume the shape of the forming punch 30. As shown schematically in FIGS. 3a and 3b, the forming punch 30 may have a shape that forms a flange 12 with a triangular cross section. The forming punch 30 may also be curved and or include a ridge of some sort in order to transfer this shape onto the flange 12. The forming punch 12 is in this schematic figure rectangular and leaves a rectangular flange. However, the forming punch 30 may be any other suitable shape in order to produce a suitable shaped flange 12.

Figure 4:
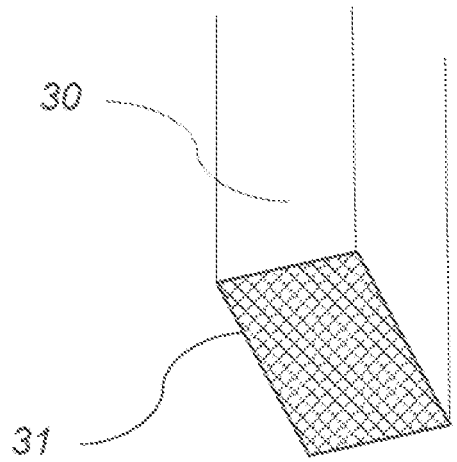
FIG. 4 is a perspective view of a forming punch according to an embodiment of the invention.
Figure 5:
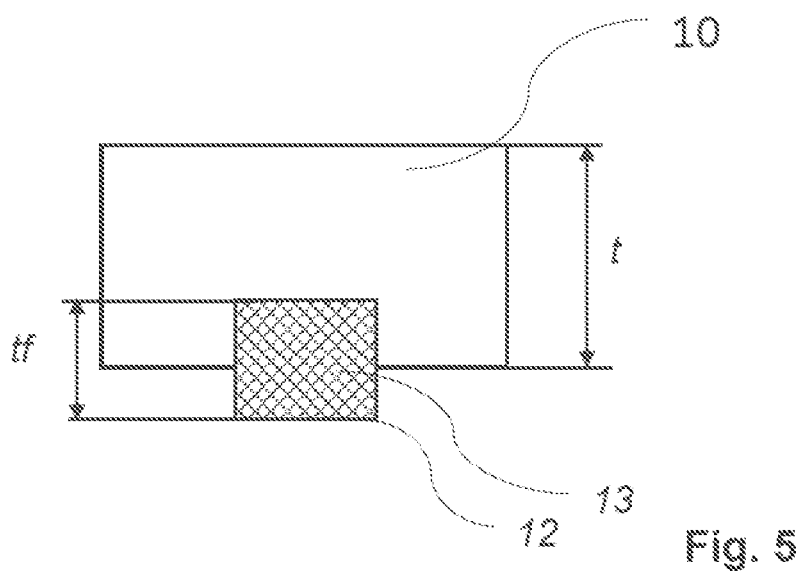
FIG. 5 is a top view of a fastening arrangement according to an embodiment of the invention.

Referring to FIGS. 4 and 5, there are shown a forming punch 30 with a patterned punch surface 31 in FIG. 4. The patterned punch surface 31 of the forming punch 30 may transfer to the flange upper surface 13. In FIG. 5 there is a top view of a tube with a formed flange 12 and where the flange has a patterned flange upper surface 13. The pattern may be any suitable pattern such as ridges, rifles, or grooves which may add extra grip or other functions to the fastening arrangement 100. The flange upper surface 13 may in other embodiments be formed without a pattern.

Figure 6:
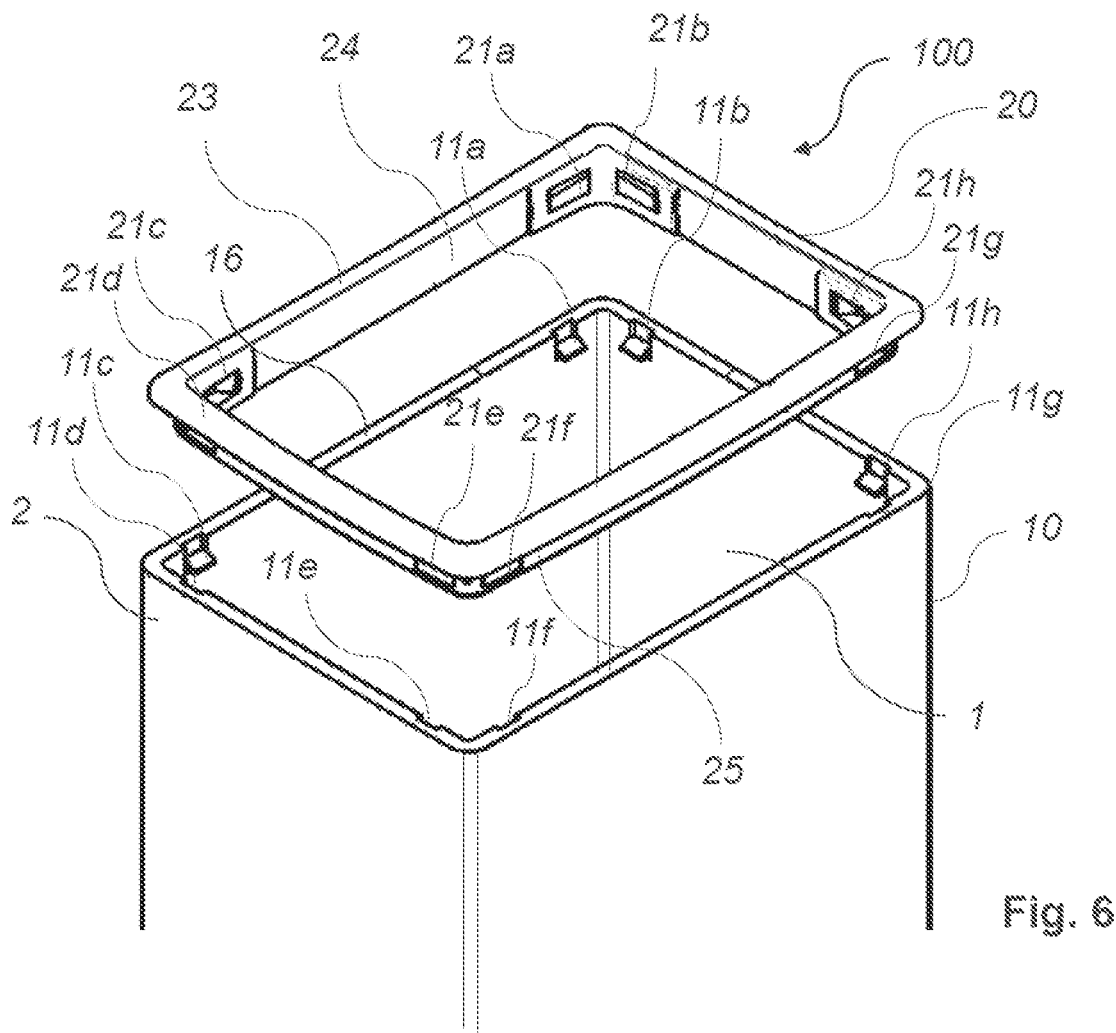
FIG. 6 shows a product according to an embodiment of the invention.

FIG. 6 shows a tube arrangement 100 according to the invention. Here is shown a tube 10 in the form of a hollow tube. The collar 20 is a collar to be arranged on an edge 16 of the tube 10. The collar 20 has a top portion 23 and a side portion 24. The side portion may be inserted in the tube until an underneath surface 25 of the top portion 23 rests on the edge 16 of the tube 10. When being arranged in place, the fastening arrangement 100 is formed. The snap portion 11a-h snaps into the corresponding receiving portions 21a-h by means of the flanges 12. The tube 10 in the figure is a rectangular hollow tube. It may be emphasized that this product does not limit the field of use for the fastening arrangement according to the invention. The fastening arrangement may be equally useful with fastening other elements than a tube and a collar.

Figure 7:
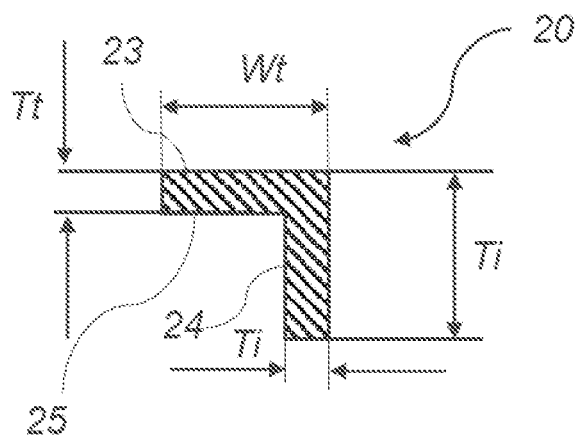
FIG. 7 is a cross sectional view of a schematic figure of a collar according to an embodiment of the invention.

FIG. 7 is a cross sectional view of a schematic figure of a collar 20 according to an embodiment of the invention. The collar 20 has a top portion 23 and a side portion 24. The top portion has an underneath surface 25. In this schematic figure the edges are sharp. However, it is possible that the edges are rounded or chamfered. The side portion 24 may also be tapered. The top portion 23 may have a thickness of Tt and a width Wt. The side portion may have a thickness Ti and a length Li.

Figure 8:
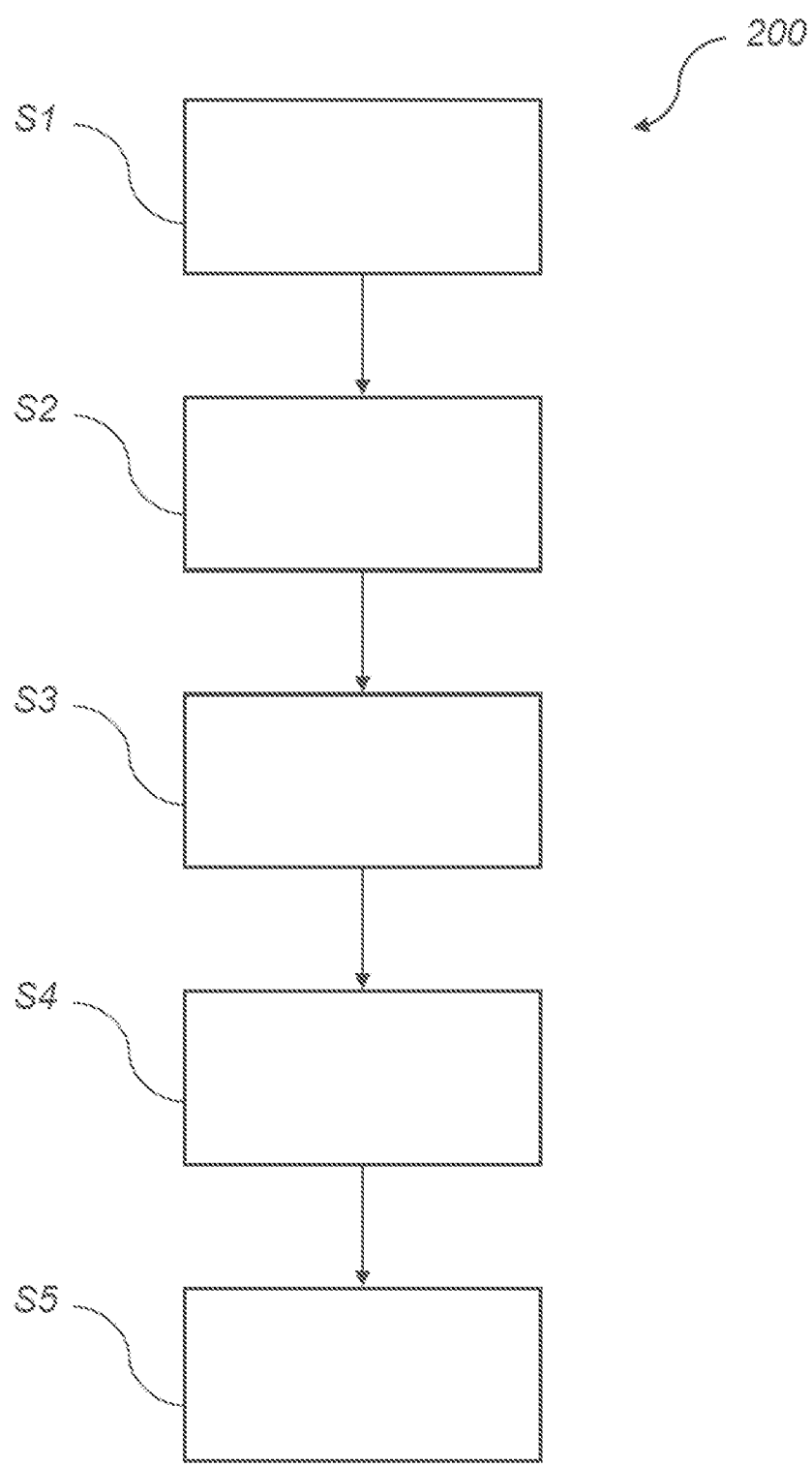
FIG. 8 is a flow chart of a method according to an embodiment of the invention.

FIG. 8 illustrates a flow chart of a method 200 according to an embodiment of the present invention. The method 200 comprises the steps of providing S1 a hollow tube 10, arranging S2 the tube for receiving a forming punch in the axial direction at the edge portion 16 of the tube 10, punching S3 the tube 10 with a forming punch 30 at an inner radial part of the edge portion 16, to form a snap portion 11 in the form of a flange 12, providing S4 a collar 20 configured to be arranged on the tube and comprising a receiving portion 21a-h configured to receive the snap portion, and arranging S5 the collar 20 on the tube 10 such that the snap portion 11 engages with the receiving portion 21a-h.

In the drawings and specification, there have been disclosed preferred embodiments and examples of the invention and, although specific terms are employed, they are used in a generic and descriptive sense only and not for the purpose of limitation, the scope of the invention being set forth in the following claims.

REFERENCE NUMERALS 100 fastening arrangement
10 tube
11 snap portion
12 flange
13 flange upper surface
15 groove
16 edge portion
1 inner surface
2 outer surface
20 collar
21 receiving portion
23 top portion
24 inner portion
25 underneath surface
30 forming punch
31 punch surface
40 holder
41 punching die

The invention claimed is:

1. A method for fastening a tube to a collar in a furniture arrangement, the method comprising steps of:
   a) providing a hollow tube formed of a material, the tube having a material thickness surrounding the circumference of the tube forming an inner surface towards a hollow of the tube and an outer surface facing radially outwards,
   b) arranging said tube for receiving at least one forming punch in an axial direction of the tube,
   c) punching said tube with the at least one forming punch at a plurality of locations along an inner radial part of an edge portion of the tube in the axial direction of the tube, locally reducing the tube thickness at the plurality of locations along the inner surface of the tube, so that at least of the plurality of locations the material being punched is plastically relocated from the edge portion to a location along the inner surface of the tube, locally forming a snap portion in the form of a flange in the radial direction towards the hollow inside of the tube, wherein a distance along the inner surface of the tube between one snap portion and a second snap portion is different from another distance along the inner surface between the one snap portion and a third snap portion,
   d) providing a collar configured to be arranged on said tube, wherein the collar comprises at least one receiving portion configured to receive said at least one snap portion (11a-h), and
   e) arranging the collar to the tube such that the snap portion engages with said receiving portion.

2. The method according to claim 1, wherein the flange assumes a shape corresponding to the shape of the forming punch.

3. The method according to claim 1, wherein the flange thickness depends on the amount of material being relocated by the punch.

4. The method according to claim 1, wherein the forming punch comprises a hook forming portion, so that upon punching, the flange assumes a hook shaped edge.

5. The method according to claim 1, wherein the arranging step b) comprises arranging the tube in a holder and arranging a punching die at the location of where the flange is to be located so that the forming punch is pushed towards said punching die and the flange is formed against said punching die.

6. The method according to claim 5, wherein the punching die has a surface onto which the flange is pushed so that the underside of the flange assumes the shape of the punching die.

7. The method according to claim 6, wherein the tube has a material thickness of 2 to 15 mm.

8. The method according to claim 1, further comprising a subsequent flange forming step to adjust the dimensions and/or shape of said flange.

9. The method according to claim 1, further comprising a trimming step for trimming at least one of the tube and the flange.

10. The method according to claim 1, wherein the tube is a metal tube.

11. The method according to claim 1, wherein the collar is made of a plastic material.

12. A method for fastening a tube to a collar in a furniture arrangement, the method comprising steps of:
   a) providing a hollow tube formed of a material, the tube having a material thickness surrounding the circumference of the tube forming an inner surface towards a hollow of the tube and an outer surface facing radially outwards,
   b) arranging said tube for receiving at least one forming punch in an axial direction of the tube,
   c) punching said tube with the at least one forming punch at an inner radial part of an edge portion of the tube in the axial direction of the tube, locally reducing the tube thickness at a portion of the inner surface of the tube, so that the material being punched is plastically relocated from the edge portion to a location along the inner surface of the tube, locally forming at least one snap portion in the form of a flange in the radial direction towards the hollow inside of the tube,
   d) providing a collar configured to be arranged on said tube, wherein the collar comprises at least one receiving portion configured to receive said at least one snap portion (11a-h), and
   e) arranging the collar to the tube such that the snap portion engages with said receiving portion,
   wherein the punching step c) is preceded by or including a warming step, which includes warming the forming punch and/or the tube in order to soften the material and facilitate the relocation of the material.

* * * * *